(12) United States Patent
Nevase

(10) Patent No.: US 11,217,205 B2
(45) Date of Patent: Jan. 4, 2022

(54) METHOD AND APPARATUS FOR RENDERING CONTENTS FOR VISION ACCESSIBILITY

(71) Applicant: SAMSUNG ELECTRONICS CO., LTD., Suwon-si (KR)

(72) Inventor: Prashant Kisanrao Nevase, Pune (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 16/510,306

(22) Filed: Jul. 12, 2019

(65) Prior Publication Data

US 2020/0020302 A1 Jan. 16, 2020

(30) Foreign Application Priority Data

Jul. 12, 2018 (IN) .............................. 201841026092
Jul. 10, 2019 (IN) ............................. 2018 41026092

(51) Int. Cl.
*G09G 5/10* (2006.01)

(52) U.S. Cl.
CPC ....... *G09G 5/10* (2013.01); *G09G 2320/0686* (2013.01); *G09G 2354/00* (2013.01)

(58) Field of Classification Search
None
See application file for complete search history.

(56) References Cited

U.S. PATENT DOCUMENTS 7,948,563 B2  5/2011  Sono
8,576,157 B2  11/2013  Bae
9,019,253 B2  4/2015  Drzaic
9,436,269 B2  9/2016  Yang
9,564,085 B2  2/2017  Jin et al.
(Continued)

FOREIGN PATENT DOCUMENTS

CN  102004784 A  4/2011
CN  104268152 A  1/2015
(Continued)

OTHER PUBLICATIONS

Pedzisz (SMPTE 2013 Annual Technical Conference) (Year: 2013).*
(Continued)

*Primary Examiner* — Kyle Zhai
(74) *Attorney, Agent, or Firm* — Sughrue Mion, PLLC

(57) ABSTRACT

Embodiments herein disclose a method for modifying content in an electronic device. The method may include classifying a plurality of regions in the content, wherein at least one of a lightness factor or a brightness factor is defined for each of the regions. The method may further include obtaining at least one of a candidate lightness span or a candidate brightness span for each of the classified region from a predefined lightness span database or a predefined brightness database and identifying a current brightness level of a display of the electronic device. The method further may further include identifying at least one of an optimal lightness span or an optimal brightness span by adjusting the candidate lightness span and candidate brightness span based on the current brightness level and modifying the content corresponding to each of the classified region using at least one of the optimal lightness span and the optimal brightness span.

6 Claims, 17 Drawing Sheets

(56) References Cited

U.S. PATENT DOCUMENTS

| | | |
|---|---|---|
| 2006/0268136 A1 | 11/2006 | Kaplinsky |
| 2007/0285379 A1* | 12/2007 | Jung .................. G09G 3/342 |
| | | 345/102 |
| 2008/0165116 A1* | 7/2008 | Herz .................. G09G 3/3406 |
| | | 345/102 |
| 2009/0122058 A1* | 5/2009 | Tschesnok ............. G06T 7/564 |
| | | 345/420 |
| 2009/0251487 A1 | 10/2009 | Chiang et al. |
| 2012/0188373 A1 | 7/2012 | Kwon et al. |
| 2012/0219218 A1* | 8/2012 | Demandolx ............. G06T 5/40 |
| | | 382/168 |
| 2014/0232870 A1* | 8/2014 | Mondal ................ H04N 7/183 |
| | | 348/148 |
| 2015/0220262 A1 | 8/2015 | Patel et al. |
| 2015/0243200 A1 | 8/2015 | Pan |
| 2016/0188552 A1 | 6/2016 | Wang et al. |
| 2017/0011692 A1 | 1/2017 | Lee et al. |
| 2017/0230628 A1 | 8/2017 | Ichikawa et al. |
| 2017/0311012 A1 | 10/2017 | Griffiths |

FOREIGN PATENT DOCUMENTS

| | | |
|---|---|---|
| CN | 104346403 A | 2/2015 |
| CN | 105528802 A | 4/2016 |
| CN | 105786924 A | 7/2016 |
| JP | 2017-532854 A | 11/2017 |
| KR | 10-0425312 B1 | 3/2004 |
| WO | 2012/086324 A1 | 6/2012 |
| WO | 2013185565 A1 | 12/2013 |

OTHER PUBLICATIONS

Communication (PCT/ISA/210, PCT/ISA/220 & PCT/ISA/237) dated Oct. 23, 2019 by the International Searching Authority in counterpart International Patent Application No. PCT/KR2019/008662.

\* cited by examiner

METHOD AND APPARATUS FOR RENDERING CONTENTS FOR VISION ACCESSIBILITY

CROSS-REFERENCE TO RELATED APPLICATION(S)

This application claims priority under 35 U.S.C. 119(a) of Indian Patent Application Number 201841026092 filed on Jul. 12, 2018, in the Indian Patent Office, and of an Indian Patent Application Number 201841026092 filed on Jul. 10, 2019, in the Indian Patent Office, the disclosures of each of which are incorporated by reference herein in their entirety.

BACKGROUND

1. Field

The disclosure relates to rendering contents at low light condition. More specifically, the disclosure relates to rendering contents with increased vision accessibility in an electronic device.

2. Description of Related Art

Many problems occur when viewing electronic devices at night. Typically, because of the dimmed condition at night, an electronic device used to display contents on a screen with more brightness. However, more brightness may make eyes of the user tired more easily. Thus, more effective night mode in the electronic device has been introduced such as the screen having black background at night based on the surrounding light condition.

Thus, it is desired to address the above mentioned disadvantages or other shortcomings or at least provide a useful alternative for rendering contents for vision accessibility in NM/HCM for the electronic device.

SUMMARY OF THE DISCLOSURE

Accordingly, the disclosure provides a method and system for rendering contents for low light condition (night mode) or to reduce eye strain during full light condition. For example, modifying contents for vision accessibility (high contrast mode) in an electronic device. The method comprises classifying, by the electronic device, a plurality of regions in the content wherein a span of at least one of color primitives like lightness, brightness, hue, saturation, red component, green component, blue component of the given color defined for the each of the regions and the lightness factor for each of the region is different. The plurality of regions comprises a background region, a foreground region, a text region, and an image region. The method further comprises obtaining, by the electronic device, a candidate lightness/brightness span for each of the classified region from a predefined lightness/brightness database and identifying a current brightness level of a display of the electronic device. The method further comprises identifying, by the electronic device, an optimal lightness span by adjusting the candidate lightness span based on the current brightness level and modifying the content corresponding to each of the classified region using the optimal lightness/brightness span. The content with the adjusted lightness/brightness span for each of the classified region may be rendered on a display of the electronic device.

In an embodiment, the modifying the content in each of the classified region using the optimal lightness/brightness span comprises, identifying, by the electronic device a color space associated with each of the classified region using a color space technique, converting, by the electronic device, the color space to a new color space with the defined lightness factor, spanning, the defined lightness factor on at least one of the optimal lightness span and the optimal brightness span of each of the classified region and modifying, by the electronic device (100), the content in each of the classified regions based on the color space and at least one of the optimal lightness span and the optimal brightness span.

In an embodiment, the modifying the content in each of the classified regions may include converting the optimal lightness/brightness span to the identified color space associated with each of the classified regions.

In another embodiment, the color space associated with each of the classified region may be identified using a color space technique as described below. The electronic device may identify whether an interlaced scan or a progressive scan technique needs to be used for rendering the content and a display resolution is SD. The method may further comprise selecting a BT.601 YCbCr colour space technique, based on the interlaced scan needing to be used for rendering the content and selecting one of a BT.709 YCbCr colour space technique, a BT.2020 YCbCr colour space technique, and a BT.2100 YCbCr colour space technique, based on the progressive scan technique needing to be used for rendering the content. The BT.2020 YCbCr colour space technique may be selected based on a standard-dynamic-range being used for a HD or UHD display, and a BT.709 YCbCr colour space technique may be selected based on a low-dynamic-range being used for a HD or a UHD display, and a BT.2100 YCbCr colour space technique based on a high-dynamic-range being used for a HD or a UHD display.

In another embodiment, the optimal lightness/brightness span may be identified by adjusting the candidate lightness span based on the current brightness level as follows. The electronic device identifies whether a colour of the content corresponds to one of a background colour and a foreground colour for each of the classified regions. The electronic device further inputs the background colour and the region where the background colour is used in the colour space associated with each of the classified regions and adjusts the candidate lightness span based on predefined lightness/brightness criteria based on the colour of the content corresponding to the background colour. In another embodiment, based on the colour of the region corresponding to the foreground colour the electronic device may input a background colour, the foreground colour and the region where the foreground colour is used in the colour space associated with each of the classified regions, and adjust the candidate lightness/brightness span based on a predefined lightness/brightness criteria.

In an embodiment, the candidate lightness/brightness span may be adjusted based on predefined lightness/brightness criteria as follows. The electronic device identifies whether the current brightness/lightness level is in the predefined lightness/brightness criteria, whether the current brightness/lightness level needs to be changed to the predefined lightness criteria based on the current brightness/lightness level not being within the predefined lightness/brightness criteria, and whether the content corresponding to the at least one classified region is a root background region based on the current brightness level not needing to be changed to the predefined lightness criteria. The electronic device obtains a default lightness/brightness span from the predefined lightness/brightness database, and identifies the optimal lightness/brightness span based on the candidate lightness/brightness span using a particular colour space technique based on the current brightness level being within the predefined lightness criteria. The electronic device changes the current brightness level of the display to the predefined lightness criteria, obtains a default lightness span from the predefined lightness database, and identifies the optimal lightness span based on the default lightness span and the candidate lightness span using a particular colour space technique, based on the current brightness level needing to be changed to the predefined lightness criteria. The electronic device computes a dynamic lightness span based on the candidate lightness span, and identifies the optimal lightness span based on the dynamic lightness span and the candidate lightness span using a particular colour space technique, based on the content corresponding to the at least one classified region being a root background region.

In an embodiment, the modifying the content to be rendered on the electronic device is as follows. The electronic device identifies whether the image is classified based on heuristics. Further, the electronic device identifies that an invert lightness filter needs to be applied based on the classified image based on the image being classified by the heuristics, and applies the invert lightness filter to the image while rendering the image. Further, the electronic device classifies the image based on a drawing size based on the image not being classified based the heuristics, and applies the invert lightness filter to the image while rendering the image.

In an embodiment, the electronic device classifies the image based on the drawing size as follows. The electronic device identifies that the drawing size is less than a predefined drawing threshold and rasterize the at least one image region for drawing on a temporary buffer. Further, the device may compute a plurality of pixels from the rasterized pixel and compute a plurality of image features from the plurality of pixels. The electronic device may then classify the image based on a set of pixels from the plurality of pixels having darker shades.

In an embodiment, the classification of the image based on a set of pixels from the plurality of pixels having darker shades comprises, identifying, by the electronic device (100), whether the set of pixels having darker shade out of non-transparent color pixels from the plurality of pixels, meets a darker shade criteria. Further, the electronic device may classify the image so as to invert lightness of the image based on the set of pixels having a darker shade out of non-transparent color pixels from the plurality of pixels, meeting the darker shade criteria. The electronic device may classify the image so as not to invert lightness of the image based on the set of pixels having darker shade out of non-transparent color pixels from the plurality of pixels, not meeting the darker shade criteria.

In an embodiment, the classifying of the image based on a set of pixels having darker shades from the plurality of pixels comprises identifying, by the electronic device, whether the set of pixels having a darker shade from the plurality pixels meets the darker shade criteria. The electronic device may classify the image so as to invert lightness of the image based on the set of pixels having the darker shade out of non-transparent color pixels from the plurality of pixels, meeting the darker shade criteria. The electronic device further may classify the image as not to invert lightness of the image based on the set of pixels having the darker shade out of non-transparent color pixels from the plurality of pixels, not meeting the darker shade criteria.

Accordingly, the embodiments herein provide a User Equipment (UE) for modifying contents to be rendered on a display of the electronic device. The electronic device may comprise a processor, a memory, a display, and a processor and the memory. The processor may be coupled to a content rendering engine, which may comprise a region classifier, a lightness/brightness span adjuster and a content modifier. The region classifier may classify a plurality of regions in the content, wherein a lightness/brightness factor for each of the regions is different. The content rendering engine may obtain a candidate lightness/brightness span for each of the classified region from a predefined lightness/brightness database. The content rendering engine may identify the optimal lightness/brightness based on the current brightness/lightness level. The content modifier may modify the content corresponding to each of the classified region using the optimal lightness/brightness span. The content rendering engine may render the content with the optimal lightness/brightness span for each of the classified regions.

In an embodiment, the electronic device may modify the available content using the content rendering engine coupled to the processor and the memory. The available content may contain images which may be classified or not classified previously. An image inversion filter needs to be applied on the image based on the classification of the image to be rendered. The content rendering engine may identify whether the image is classified based on heuristics. Based on the image not being classified already, the content rendering engine may classify the image based on a drawing size and may apply the invert lightness filter to the image while rendering the image. Based on the image being classified already, the content rendering engine may identify that an invert lightness filter needs to be applied and may apply the invert lightness filter to the image while rendering the image.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION OF DISCLOSURE

Figure 1:
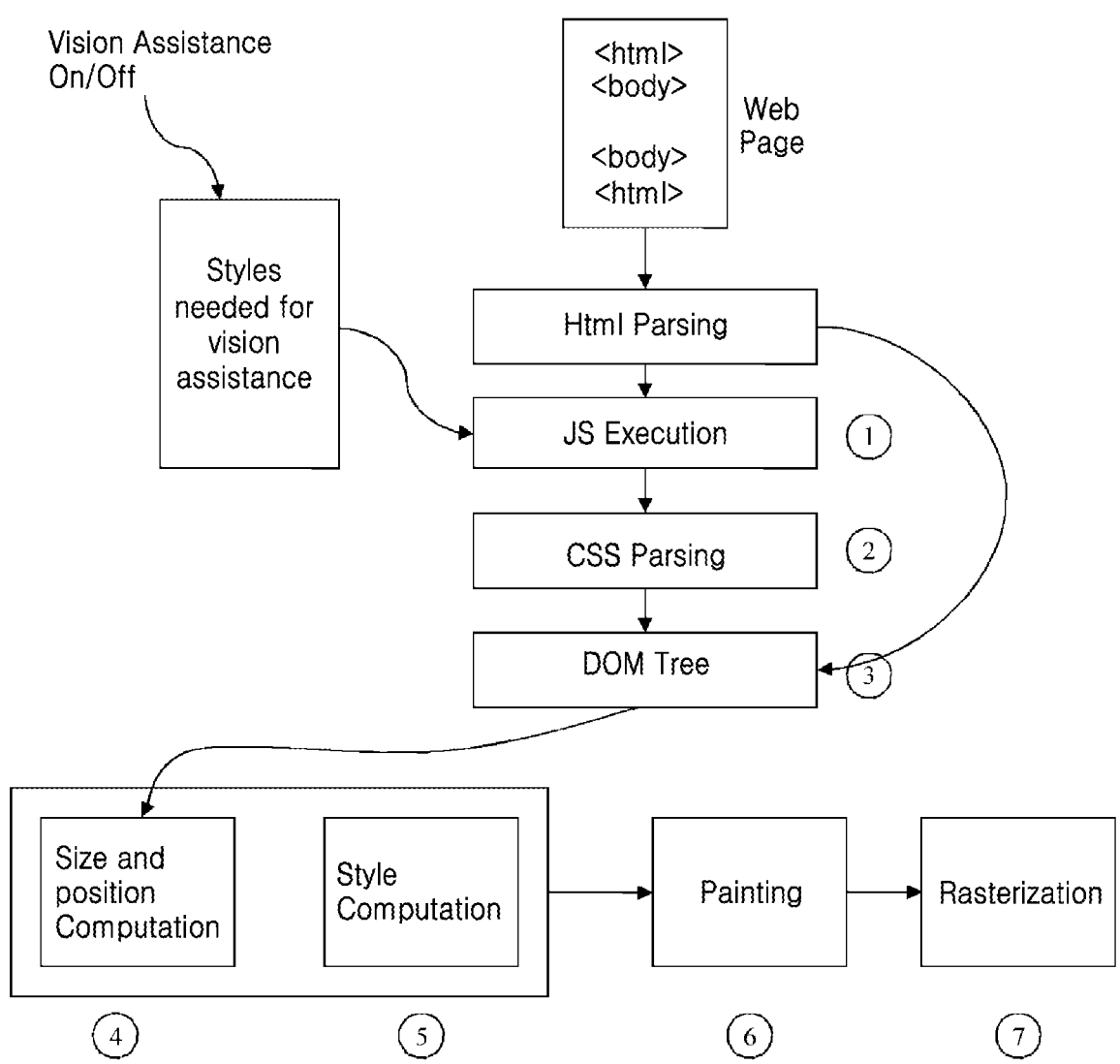
FIG. 1 is a flow diagram illustrating steps for achieving a night mode, according to an embodiment.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only.

It is to be understood that the singular forms "a," "an," and "the" include plural referents unless the context clearly dictates otherwise. Thus, for example, reference to "an eye region" includes reference to one or more of such images.

It will be understood that, although the terms first, second, etc. may be used herein in reference to elements of the disclosure, such elements should not be construed as limited by these terms. The terms are used only to distinguish one element from other elements.

It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

In various embodiments of the disclosure, "module," "engine" or "unit" may perform at least one function or operation, and may be implemented with hardware, software, or a combination thereof "Plurality of modules" or "plurality of units" may be implemented with at least one processor through integration thereof with at least one module other than "module" or "unit" which needs to be implemented with specific hardware.

The embodiments herein disclose a method for rendering contents for low light condition (night mode) or to reduce eye strain during full light condition. For example, modifying contents for vision accessibility (high contrast mode) in an electronic device. The method may comprise classifying, by the electronic device, a plurality of regions in the content wherein a lightness factor is defined for the each of the regions and the lightness factor for each of the region is different. The plurality of regions may comprise a background region, a foreground region, a text region, and an image region. The method may further comprise obtaining, by the electronic device, a candidate lightness span for each of the classified region from a predefined lightness database and identifying a current brightness level of a display of the electronic device. The method may further comprise identifying, by the electronic device, an optimal lightness span by adjusting the candidate lightness span based on the current brightness level and modifying the content corresponding to each of the classified region using the optimal lightness span. The content with the adjusted lightness span for each of the classified region is rendered on a display of the electronic device.

The proposed disclosure provides an electronic device which achieves a better performance while providing the content in a night mode. The method and apparatus also preserves the original contrast while providing the content in the night mode.

Referring now to the drawings, and more particularly to FIGS. 1 through 16, where similar reference characters denote corresponding features consistently throughout the drawings.

The disclosure relates to color conversion for achieving desired contrast effect based on span of at least one of color attributes such as lightness, brightness, hue, saturation, red component, green component, blue component of the given color without losing styles, theme or contrast of original content at low light condition. The disclosure also relates to a method and an apparatus for rendering contents in a night mode and providing vision accessibility in the night mode in an electronic device.

The night mode (NM) or the high contrast mode (HCM) in an electronic device generally deals with color of the content. These modes make backgrounds of the content darker and foregrounds (e.g. text) of the contents brighter. For a few scenarios mentioned below, the NM/HCM styles may show unexpected behaviors. The content may sometimes have the background as an image having most pixels having white color and texts having black color. While applying NM/HCM to such an image, text color may need to be changed to a brighter color and the image may need to be more dimmed to make texts legible over the image.

Alternatively, the electronic device may modify page element colors using java script or change colors to a predefined set of colors in a dimmed light condition. Alternatively, the electronic device may embed a preset code with the function of changing the color of the page element of the web or apply an image filter to Skew Picture to achieve an appropriate night mode. Alternatively, the electronic device may use a Cascading Style Sheets (CSS) style and apply java script or may change a brightness level for the display using a same gesture to achieve an appropriate night mode.

In an embodiment, the content modifications are performed to have desired color effect. This method mandates to have colors needed to render the desired effect but requires more power consumption than the previous methods.

Alternatively, brightness adjustment (reduction) of colors in content may be performed to achieve an appropriate night mode. However, reduction of colors may not actually reduce the eye strain as human eyes perceive different brightness values for different color channels. Further, the brightness adjustment may have other problems that different displays define different levels of brightness and the objects in the image may look too darker (blurry) or too light (lighter than expected).

In an embodiment, the electronic device may make predefined converted colors to achieve an appropriate night mode. The predefined converted colors may cause contents to lose its original color and look. FIG. 1 is a flow diagram illustrating steps for achieving a night mode, according to an embodiment. The costs for an approach based on FIG. 1 may include the cost for 1—Java Script (JS) execution, the cost for 2—Cascading Style Sheets (CSS) Parsing, the cost for 3—applying styles in a Document Object Model (DOM) tree, the cost for 4—Size & Position computation, the cost for 5—style computation, the cost for 6—Painting, and the cost for 7—Rasterization. The execution time for the above method for Night mode on/off may be about 2480 milliseconds. In another example, a method may require the costs for implementation including the cost for Modifying styles in DOM tree, the cost for Size & position computation, the cost for Style computation, the cost for Painting, and the cost for Rasterization. The execution time of the method for Night mode on/off may be 570 milliseconds. In another example, the method may use fixed colors for content, which loses the original color distinction the content developer has made. In another example, a method may be based on brightness and cause blurriness and may not reduce eye strain to an expected level. Another method is based on lightness and causes to lose content color distinction. Filters work by processing on all pixels increasing power consumption (e.g., for drawing big rectangle with filled color, all pixels need to be processed). Styles applied using java script or CSS requires more power consumption for processing styles and JS execution if used in web. The methods, however, may not seamlessly work for all type of display capabilities like on different dynamic range devices the effect achieved would be different and may not actually reduce eye strain.

In an embodiment, a method for modifying content in an electronic device is provided. The method may comprise identifying, by the electronic device, at least one region of the content corresponds to an image, identifying whether the image is classified based on heuristics, performing one of identifying whether at least one of an invert brightness filter or an invert lightness filter needs to be applied based on the classified image based on the image being classified by the heuristics, and applying the at least one of the invert brightness and the invert lightness filter to the image while rendering the image; and classifying the image based on a drawing size based on the image not being classified based on the heuristics, and applying at least one of the invert brightness and the invert lightness filter to the image while rendering the image.

In an embodiment, the classifying of the image based on the drawing size comprises identifying the drawing size being less than a predefined drawing threshold, rasterizing the at least one image region for drawing on a temporary buffer, computing a plurality of pixels from the rasterized pixels, computing a plurality of image features from the plurality of pixels, and classifying the image based on a set of pixels from the plurality of pixels having darker shades.

In an embodiment, wherein the classifying of the image based on the set of pixels from the plurality of pixels having darker shades comprises identifying whether the set of pixels having darker shade out of a non-transparent color pixels from the plurality of pixels, meets a darker shade criteria, performing one of (1) classifying the image to invert at least one of the brightness or lightness of the image based on the set of pixels having a darker shade out of a non-transparent color pixels from the plurality of pixels, meeting the darker shade criteria; and (2) classifying the image not to invert at least one of the brightness or the lightness of the image based on the set of pixels having darker shade out of a non-transparent color pixels from the plurality of pixels, not meeting the darker shade criteria.

In an embodiment, the classifying of the image based on the set of pixels having darker shades from the plurality of pixels comprises identifying, by the electronic device (100), whether the set of pixels having a darker shade from the plurality pixels meets a darker shade criteria, and performing one of (1) classifying the image to invert at least one of the brightness or the lightness of the image based on the set of pixels having darker shade out of a non-transparent color pixels from the plurality of pixels, meeting the darker shade criteria, and (2) classifying the image not to invert at least one of the brightness and the lightness of the image based on the set of pixels having darker shade out of a non-transparent color pixels from the plurality of pixels, not meeting the darker shade criteria.

In an embodiment, a method for modifying image content in an electronic device is provided. The method may comprise identifying whether the image content is to be modified based on at least one of a current display brightness and a user's preference, identifying a current display brightness level of a display of the electronic device, identifying the user's preference, and applying, by the electronic device, at least one of a brightness filter or the lightness filter on the image based on one of the current brightness level of display of the electronic device (100) and the user's preference. In an embodiment, the applying of the at least one of the brightness filter or the lightness filter on the image comprises obtaining a default brightness value based on identifying that the current brightness level is in a predefined criteria and applying the brightness filter on the image with the default brightness value.

In an embodiment, the applying of the at least one of the brightness filter or the lightness filter on the image comprises obtaining default lightness value based on identifying that the current lightness level is in a predefined criteria and applying the lightness filter on the image with the default lightness value.

In an embodiment, the applying of the at least one of the brightness filter or the lightness filter on the image comprises computing a brightness value based on identifying that the current brightness level is not in a predefined criteria and applying the brightness filter on the image with the computed brightness value.

In an embodiment, the applying of the at least one of the brightness filter or the lightness filter on the image comprises computing a lightness value based on identifying that the current lightness level is not in a predefined criteria and applying the lightness filter on the image with the computed lightness value.

In an embodiment, provided is a method of rendering content in a dimmed light condition. The method comprises dividing the content into a plurality of regions comprising a background region and a foreground region, detecting lightness value for each of the plurality of regions, adjusting the lightness value for the each of the plurality of regions to a predetermined range, and displaying the content with the adjusted lightness value for the each of the plurality of regions.

In an embodiment, the plurality of regions further comprises and a text region, an image region and a border region.

In an embodiment, the lightness value for the background region is different from the lightness value for the foreground region.

Figure 2:
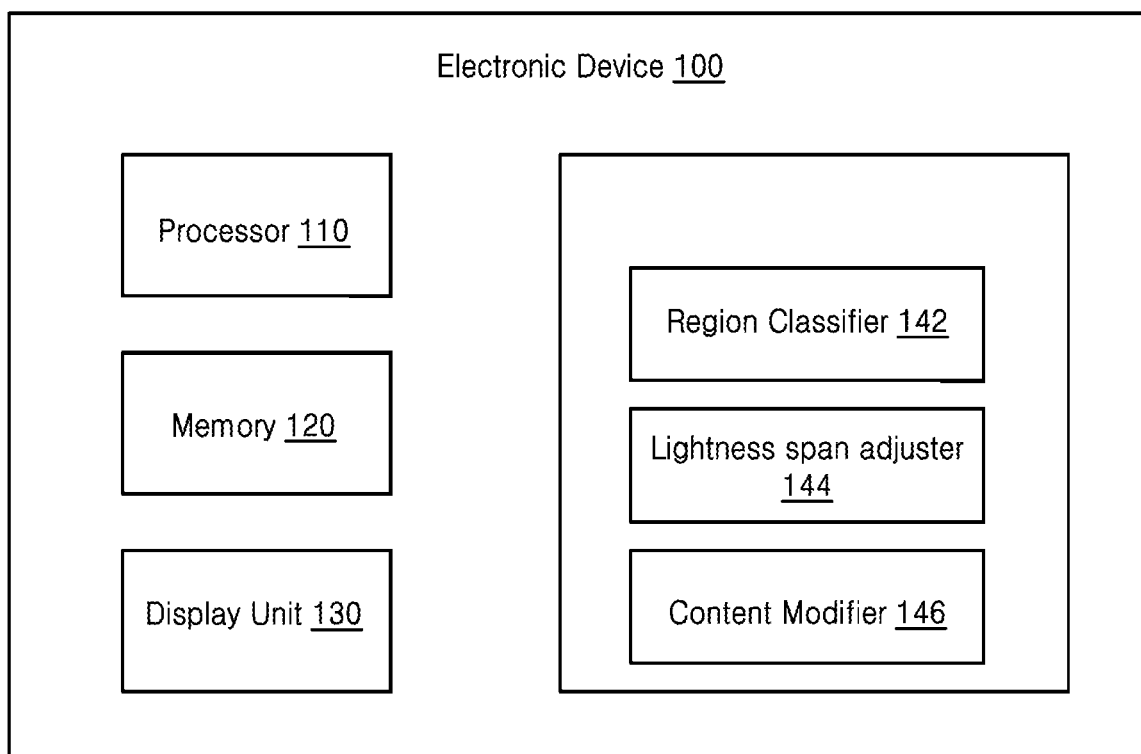
FIG. 2 is a block diagram illustrating an electronic device 100 for rendering contents for vision accessibility, according to an embodiment.

FIG. 2 is a block diagram illustrating an electronic device 100 for rendering contents for vision accessibility, according to an embodiment. The examples of the electronic device 100 are, but not limited to a smart phone, a tablet computer, a personal computer, a desktop computer, a mobile device, a personal digital assistance (PDA), a multimedia device, an Internet of Things (IoT) device, and the like. The electronic device 100 may include a processor 110, a memory 120, a display unit 130, and a content rendering engine 140. The display unit 130 is used for displaying the contents rendered by the electronic device 100. The content rendering engine 140 may include a region classifier 142, a span adjuster 144 and a content modifier 146. The content rendering engine 140 modifies the content available on the electronic device 100 for displaying on the display unit 130.

The region classifier 142 may classify or divide the available content into a plurality of regions by analyzing the available content. The plurality of regions may include, but are not limited to a background region, a foreground region, an image region, a text region, a root background region, a button background region, a menu-list background region, a menu-list button background region, a menu-list button arrow region, a gradient fill region, a border region, an outline region, a box shadow, an SVG (scalable vector graphics), and the like. The plurality of regions for classifying the available content can be changed based on a CSS box model. In the CSS model, each element of the content is represented by a box having a border, padding, and a margin. The CSS box model may be used to create the design and layout of web pages.

The content rendering engine 140 after classifying the available contents, may define a lightness value and/or brightness value for each of the classified region. Each of the lightness value corresponding to each of the classified region may be different from each other. Likewise, each of the brightness value corresponding to each of the classified region may be different from each other.

Color has four different channels of Red, Green, Blue and Alpha which represents transparency. For example, the green color is the brightest channel and the blue color represents the darkest channel among all channels. Channels with less brightness will look dull or blurry. E.g., if the color of RGB(255, 255, 255) has 10% less brightness value than the color of RGB(25, 25, 25). Whereas, the lightness the brightness of individual channel compared with brightness of white color. Thus, when 10% lightness is expected, the color would produce 10% lightness from its channels without losing the color shade. For example, the pure red color of RGB(255, 0, 0) may have lightness A lightness factor represents a lightness value. For example, among red, blue, and green color, green is brighter and blue is dimmer Therefore green is lighter than blue. The brightness relates to luminance of the given color. Similarly, a brightness factor represents a brightness value.

After defining the at least one of the lightness factor and the brightness factor for each of the classified regions, the content rendering engine 140 obtains at least one of a candidate lightness span and a candidate brightness span for each of the classified regions from a predefined lightness database and a predefined brightness database. The lightness span specifies the collection of lightness values ranging from minimum lightness value to maximum lightness value and is defined by interval having minimum and maximum lightness values. The brightness span specifies the collection of brightness values ranging from minimum brightness value to maximum brightness value and is defined by interval having minimum and maximum brightness values. The content rendering engine 140 identifies a current brightness of the display unit 146 of the electronic device 100. The span adjuster 144 identifies an optimal lightness span by adjusting the candidate lightness span based on the current brightness level of the display unit 146. In another embodiment the span adjuster 144 identifies an optimal brightness span by adjusting the candidate brightness span based on the current brightness level of the display unit 146.

In an embodiment, the content modifier 146 modifies the available contents corresponding to each of the classified region using the identified optimal lightness span. In another embodiment the content modifier 146 modifies the available contents corresponding to each of the classified regions using the identified optimal brightness span. The content rendering engine 140 renders the content with the adjusted lightness span and/or brightness span for each of the classified regions. The method can be used for rendering the content either using the lightness span or the brightness span, based the choice of the user.

In an embodiment, the processor 110 and content rendering engine 140 may be implemented as one hardware processor. Alternatively, the processor 110 may perform the foregoing operations performed by the content rendering engine 140.

Figure 3:
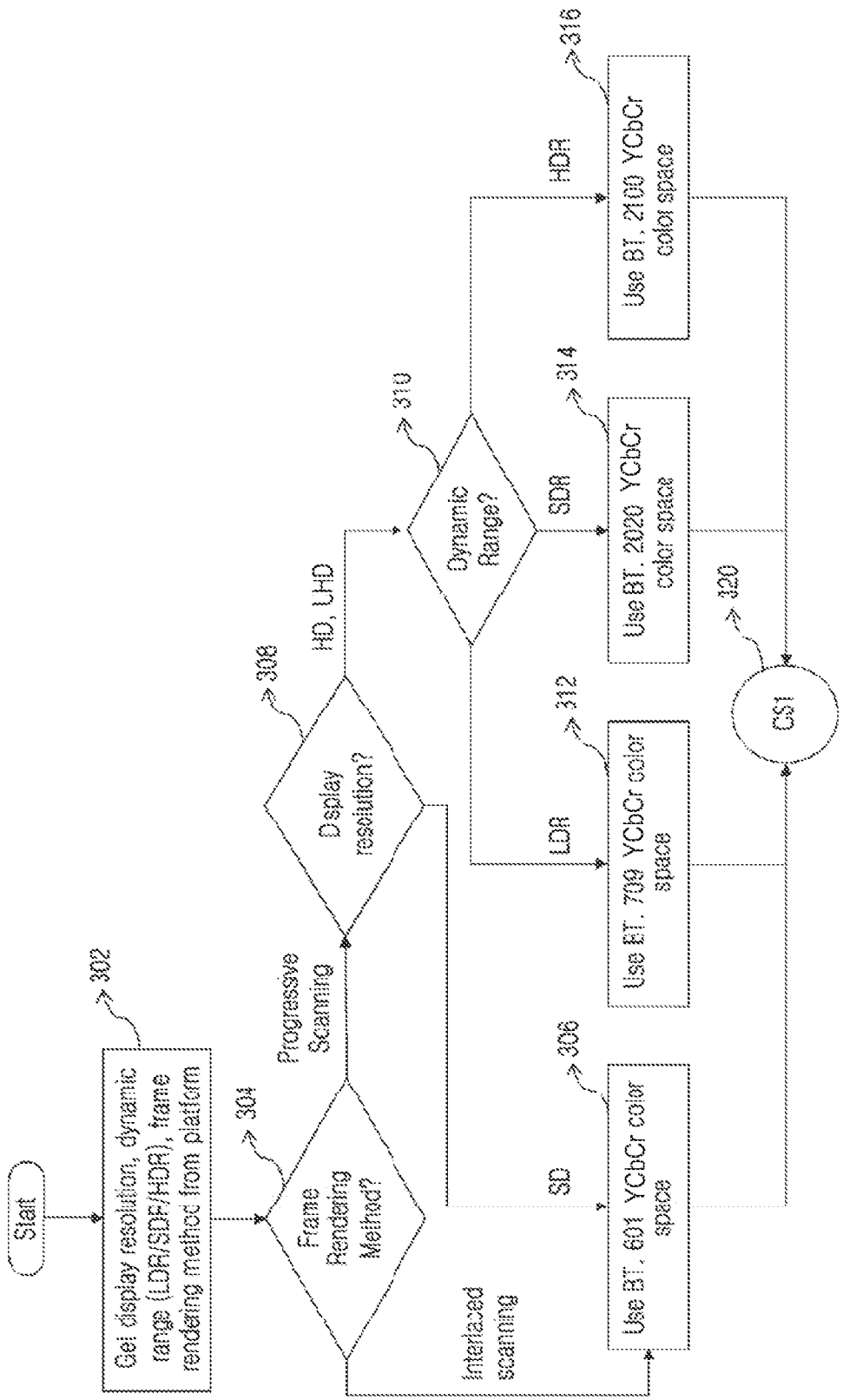
FIG. 3 illustrates a flowchart for selecting appropriate color space converter, according to an embodiment.

FIG. 3 illustrates a flowchart for selecting appropriate color space converter, according to an embodiment. The space conversion may be based on a dynamic range, a frame rendering method, and a display resolution of the display unit 130. In operation 302, the display resolution, the dynamic range, and the frame rendering method is obtained from platform. In general, the platform means the environment in which a piece of software or an application is executed. The platform may include the hardware or the operating system, even a web browser and associated application programming interfaces in this field. In operation 304, the electronic device 100 identifies which frame rendering method may be used. If the frame rendering method is progressive scanning method then the flow proceeds to 308 and if the frame rendering method is interlaced scanning method then the flow proceeds to 306. In 306 the BT.601 YCbCr color space is selected. As well know, the YCbCr color space is defined in ITU-R BT.601 standard. In operation 308, the electronic device 100 identifies whether the resolution of the display unit 130 is one of a High Definition (HD), an Ultra High Definition (UHD), and a Standard definition (SD). The flow proceeds to 306 and BT.601 YCbCr color space is selected if the resolution of the display unit 130 is SD. The flow proceeds to 310 if the resolution of the display unit 130 is one of a HD or UHD. In operation 310, the electronic device 100 identifies the dynamic range for the display, where the dynamic range is one of a Low dynamic range (LDR), a standard dynamic range (SDR) and a high dynamic range (HDR). If the dynamic range is HDR the flow proceeds to 312. In operation 312, the BT.709 YCbCr color space is selected. If the dynamic range is SDR the flow proceeds to 314. In operation 314, the BT.2020 YCbCr color space is selected. If the dynamic range LDR, the flow proceeds to 316. In operation 316 the BT.2100 YCbCr color space is selected.

In an embodiment, the method for selecting the color space technique may be different from the above stated examples and may depend on the lightness factor.

Figure 4:
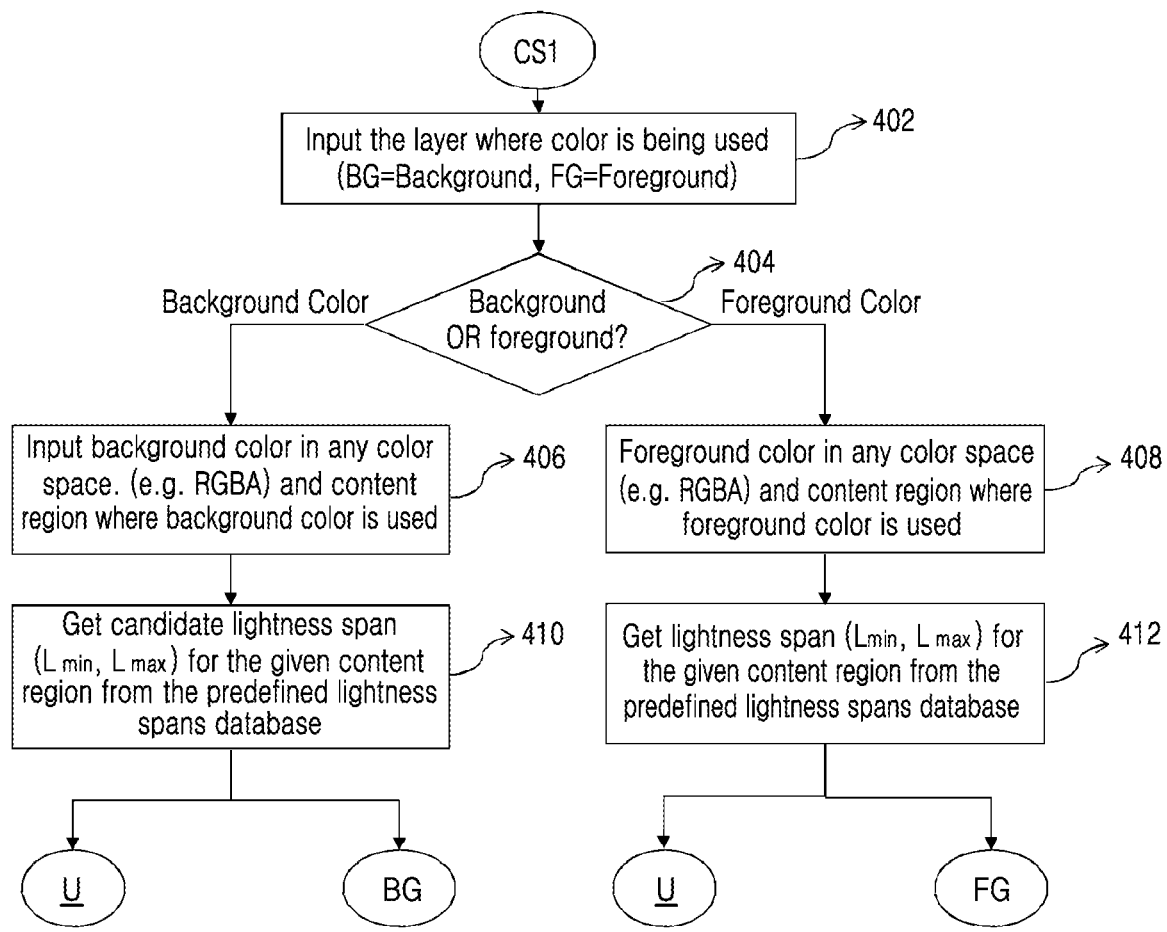
FIG. 4 illustrates a flowchart for obtaining required lightness/brightness effect, according to an embodiment.

FIG. 4 illustrates a flowchart for obtaining required lightness/brightness effect, according to an embodiment. In operation 402, the electronic device 100 may receive inputs of the classified plurality of regions where color is used. The plurality of regions may be the background region, the foreground region, the image region, the text, the root background region, the button background region, the menu-list background region, the menu-list button background region, the menu-list button arrow region, a gradient fill region, a border, an outline, a box shadow, a SVG (scalable vector graphics), and the like. In operation 404, the electronic device 10 confirms the region as one of the plurality of classified region. The flow proceeds to step 406 if the electronic device 100 confirms the region as a background region and the flow proceeds to step 408, if the electronic device 100 confirms the region as a foreground region. In operation 406 the electronic device 100 inputs the background region color and the color space used for color. The color space may be one of a RGBA color space, an YCbCr color space and the like. In operation 410, the candidate lightness span and/or the candidate brightness span for the available content of the background is obtained from a predefined database of the lightness span and/or brightness span. The predefined database includes a list of lightness span and a list of brightness span specified for different regions classified from the content. After obtaining the candidate lightness span and/or the candidate brightness span for the available content of background the flow proceeds either to U or to BG as shown in FIG. 4. BG is explained referring to FIG. 5 and U is explained referring to FIG. 9. BG relates to adjusting the candidate lightness span and/or the candidate brightness span based on a current brightness of the display unit 130. U relates to adjusting the candidate lightness span and/or the candidate brightness span based on a user's requirement of contrast of the available content of background.

In operation 408, the electronic device 100 inputs the background color and foreground color for the given foreground region and the color space used for color. In operation 412, the candidate lightness span and/or candidate brightness span for the available content of foreground is obtained from the predefined database of the lightness span and the predefined database of the brightness span. After obtaining the candidate lightness span and/or the candidate brightness span for the available content of foreground, the flow proceeds either to U or to FG. FG is explained referring to FIG. 7 and U is explained referring to FIG. 9. FG relates to adjusting the candidate lightness span and/or candidate brightness span based on the current brightness of the display unit 130. U relates to adjusting the candidate lightness span and/or candidate brightness span based on the user's requirement of contrast of the available content of background.

Figure 5:
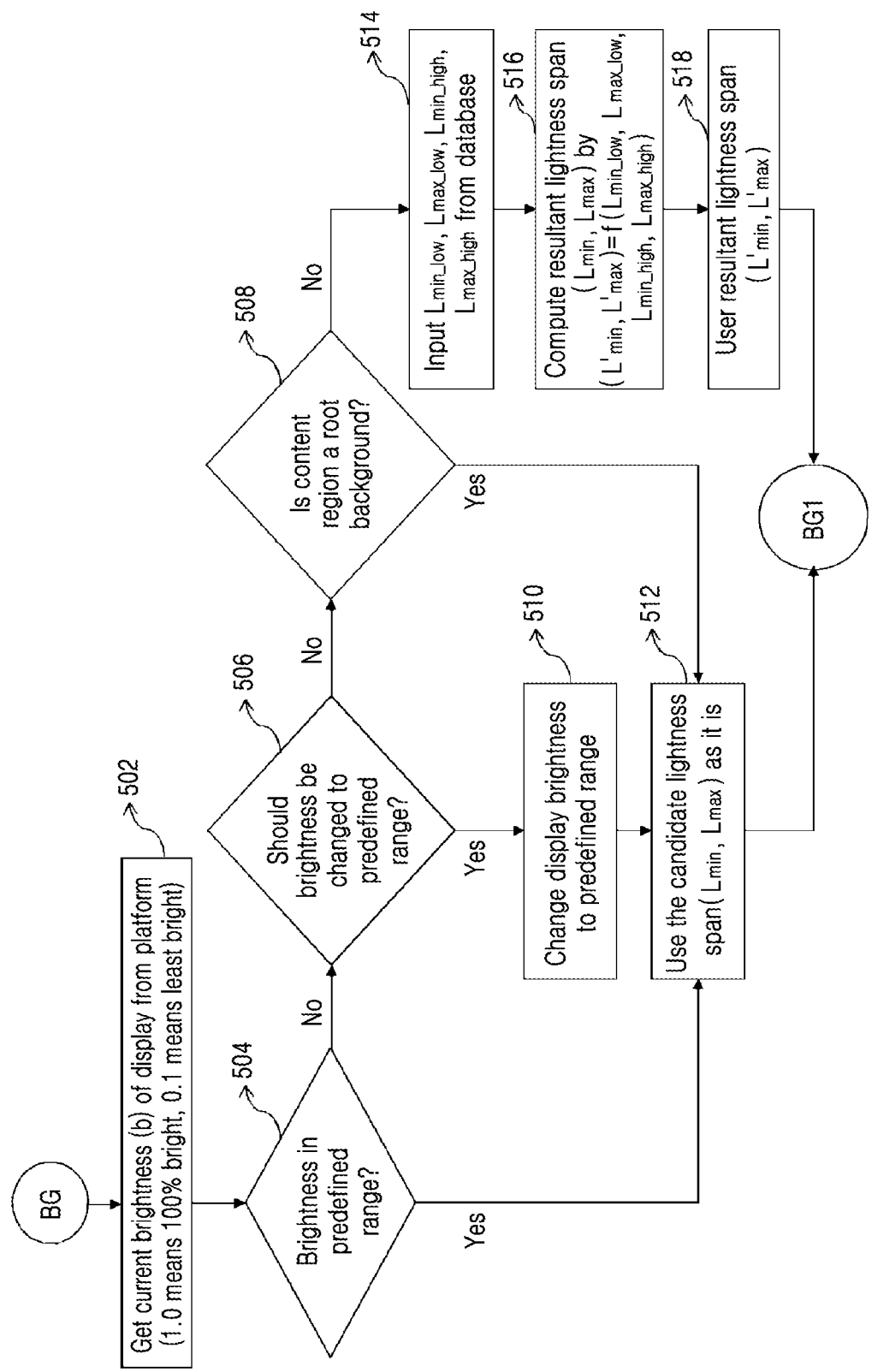
FIG. 5 illustrates a flowchart for adjusting the lightness span/brightness span, according to an embodiment.

FIG. 5 illustrates a flowchart for adjusting the lightness span/brightness span, according to an embodiment. Referring to FIG. 5, in operation 502, the current brightness of the display unit 130 is obtained from the platform. In operation 504, the electronic device 100 identifies whether the brightness is in a predefined range. The predefined brightness range is the range of brightness values provided at the time of development. If the brightness of display is a particular range, all candidate lightness spans can be used (without modifying/adjusting those spans). In operation 512, the candidate lightness span and/or candidate brightness span is obtained in operation 410 is used as it is with its maximum and minimum values and the flow proceeds to BG1. If the brightness is not in a predefined range then the flow proceeds to 506. In operation 506, the electronic device 100 identifies whether the brightness needs to be changed to a predefined range. The flow proceeds to 508 if the brightness is not to be changed to a predefined range or the flow proceeds to 510 if the brightness has to be changed to a predefined range. In operation 510, the brightness is changed to the predefined range and the flow proceeds to 512. In operation 508 the electronic device identifies 100 whether the content region is a root background. The flow proceeds to 514 if the content region is not the root background region or the flow proceeds to 512 if the region is a root background region.

In operation 514, the minimum and maximum values of the lightness are computed based on the current display brightness. The minimum and maximum values of the lightness in the candidate lightness span are adjusted based on the current display brightness. In operation 516, the values of optimal lightness span/optimal brightness span is computed for the available background content. Minimum ($L_{min}$) and maximum ($L_{max}$) lightness values for the optimal lightness span and/or brightness are computed using at least one of linear and non-linear function. Let L be the candidate lightness span/candidate brightness span and L' be the optimal lightness span/optimal brightness span. The optimal lightness span/optimal brightness span L' is obtained using a non-linear function ($L'_{min}$, $L'_{max}$)=f($L_{min\_low}$, $L_{max\_low}$, $L_{min\_high}$, $L_{max\_high}$).

The values of the optimal lightness span computed are $L_{min\_high}$, $L_{min\_low}$, $L_{max\_high}$, and $L_{max-low}$, wherein $L_{min\_low}$ is the minimum representation of the minimum value $L_{low}$, $L_{min\_high}$ is the highest representation of the minimum value $L_{low}$, $L_{max\_high}$ is the maximum representation of the maximum value $L_{max}$ and $L_{max\_low}$ is the minimum representation of the maximum value $L_{max}$.

In operation 518, the candidate lightness span/candidate brightness span values $L'_{min}$, $L'_{max}$ are used and the flow proceeds to BG1.

Figure 6:
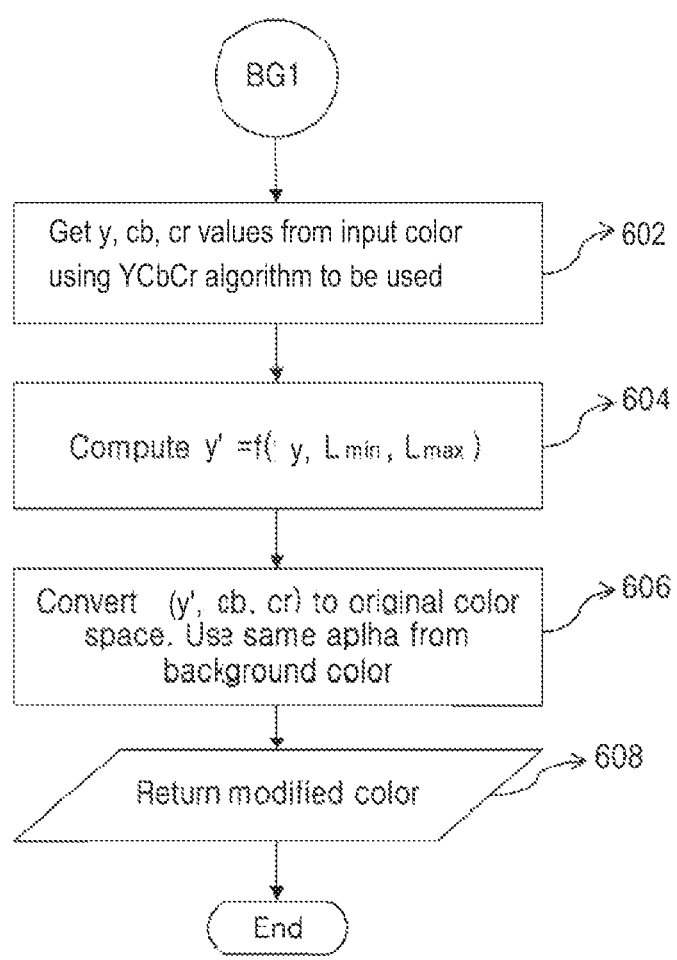
FIG. 6 illustrates a flowchart for returning a modified color, according to an embodiment.

FIG. 6 illustrates a flowchart for returning a modified color, according to an embodiment. In operation 602, Y1, Cb and Cr values are obtained from the input color for the background region based on the YCbCr color space. In operation 604, the optimal lightness values and/or the optimal brightness values for the Y1, Cb and Cr color are obtained using y1'=f(y1, $L_{min}$, $L_{max}$).

In operation 606, the new color obtained with optimal lightness and/or optimal brightness gets converted to original color space using the same alpha from background color. In operation 608, a modified color is returned by the electronic device 100 for displaying on the display unit 130.

Figure 7:
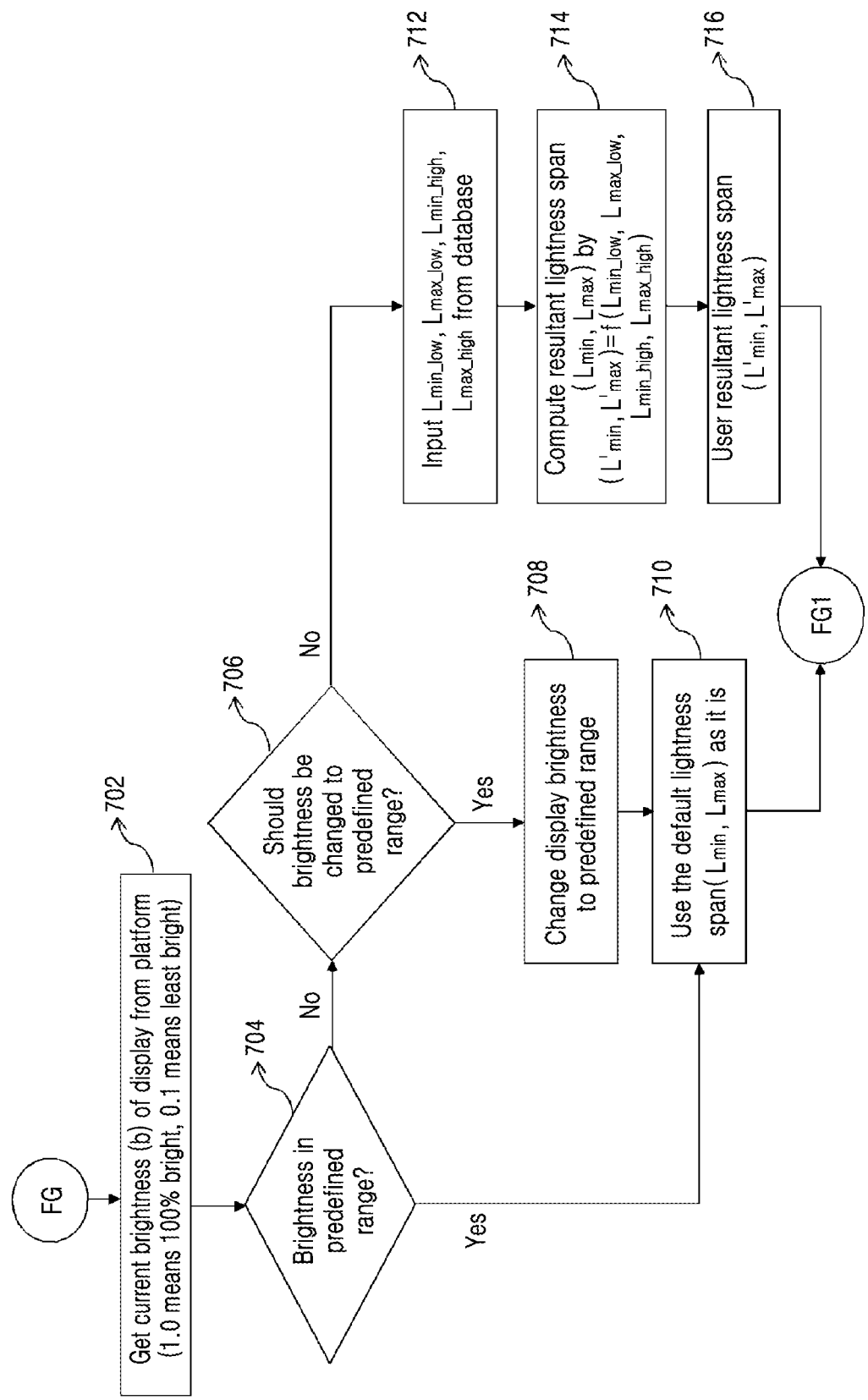
FIG. 7 illustrates a flowchart for adjusting the lightness span/brightness span using the current brightness of the display unit, according to an embodiment.

FIG. 7 illustrates a flowchart for adjusting the lightness span/brightness span using the current brightness of the display unit, according to an embodiment.

In operation 702, the current brightness of the display unit 130 is obtained from the platform. In operation 704, the electronic device 100 identifies whether the current brightness is in a predefined range. The flow proceeds to operation 710 if the current brightness is in predefined range. In operation 710, the candidate lightness span/candidate brightness span with its maximum and minimum values is used and the flow proceeds to FG1. If the current brightness is not in a predefined range then the flow proceeds to operation 706. In operation 706, the electronic device 100 identifies whether the current brightness needs to be changed to a predefined range. The flow proceeds to operation 712 if the current brightness need not be changed to a predefined range and to operation 708 if the brightness has to be changed to a predefined range. In operation 708, the brightness is changed to the predefined range and the flow proceeds to operation 710. In operation 710, the candidate lightness span/candidate brightness span with its maximum and minimum values is used and the flow proceeds to FG1. In operation 712, the electronic device 100 receives the input of values of the lightness span—$L_{min\_high}$, $L_{min\_low}$, $L_{max\_high}$, and $L_{max-low}$ from the database. The minimum and maximum values are computed based on the current display brightness. In operation 714, the optimal lightness span/optimal brightness span is computed for the available foreground content. Minimum ($L'_{min}$) and maximum ($L'_{max}$) values for the optimal lightness span/optimal brightness span are computed using linear and/or non-linear function. Let L be the candidate lightness span/candidate brightness span and L' be the optimal lightness span/candidate lightness span. The optimal lightness span L' may be obtained using a non linear function $(L'_{min}, L'_{max})=f(L_{min\_low}, L_{max\_low}, L_{min\_high}, L_{max\_high})$ The values of the optimal lightness span computed are $L_{min\_low}$, $L_{max\_high}$, and $L_{max-low}$, where $L_{min\_low}$ is the minimum representation of the minimum value $L_{low}$, $L_{min\_high}$ is the highest representation of the minimum value $L_{low}$, $L_{max\_high}$ is the maximum representation of the maximum value $L_{max}$ and $L_{max\_low}$ is the minimum representation of the maximum value $L_{max}$. The minimum and maximum values of the candidate lightness span/candidate brightness span are adjusted based on the current display brightness. In operation 716, the resultant optimal lightness span is used.

Figure 8:
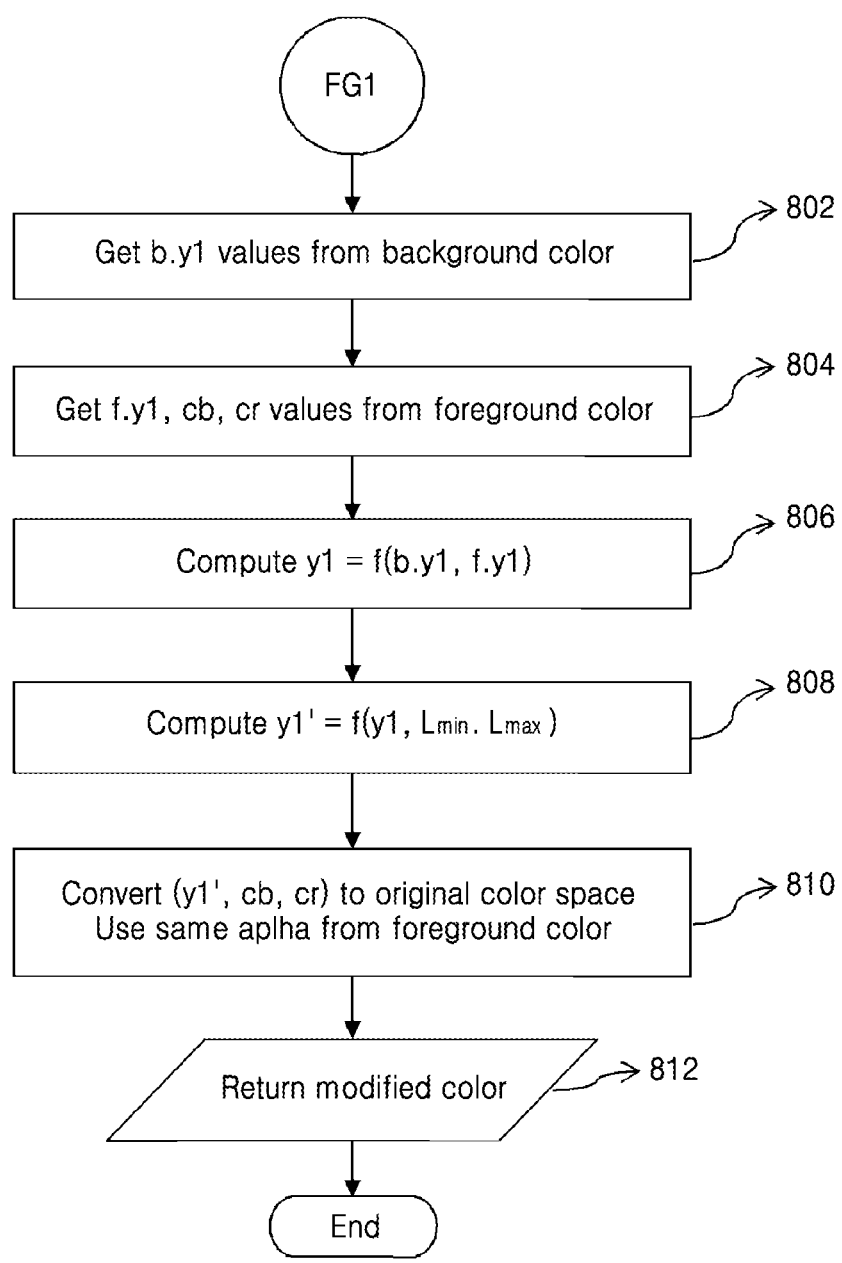
FIG. 8 illustrates a flowchart for returning a modified color, according to an embodiment.

FIG. 8 illustrates a flowchart for returning a modified color, according to an embodiment. In operation 802, Y1, Cb and Cr values are obtained from the background color derived from the operation 402 based on the selected YCbCr color space. In operation 804, the Y1, Cb and Cr values are obtained from the foreground color derived in operation 402 based on the selected YCbCr color space. In operation 806, an absolute value of lightness contrast/brightness contrast is computed using linear or non-linear function y1=f(b.y1, f.y1).

In operation 808, an optimal lightness/optimal brightness for the given color is computed such that the optimal lightness value/optimal brightness values fit in the given range of lightness span/brightness spam using y1'=f(y1, $L_{min}$, $L_{max}$).

In operation 810, the new values of the color space are converted to original color space with the same alpha from the background color. In operation 812, a modified color is returned by the electronic device 100 for displaying on the display unit 130.

Figure 9:
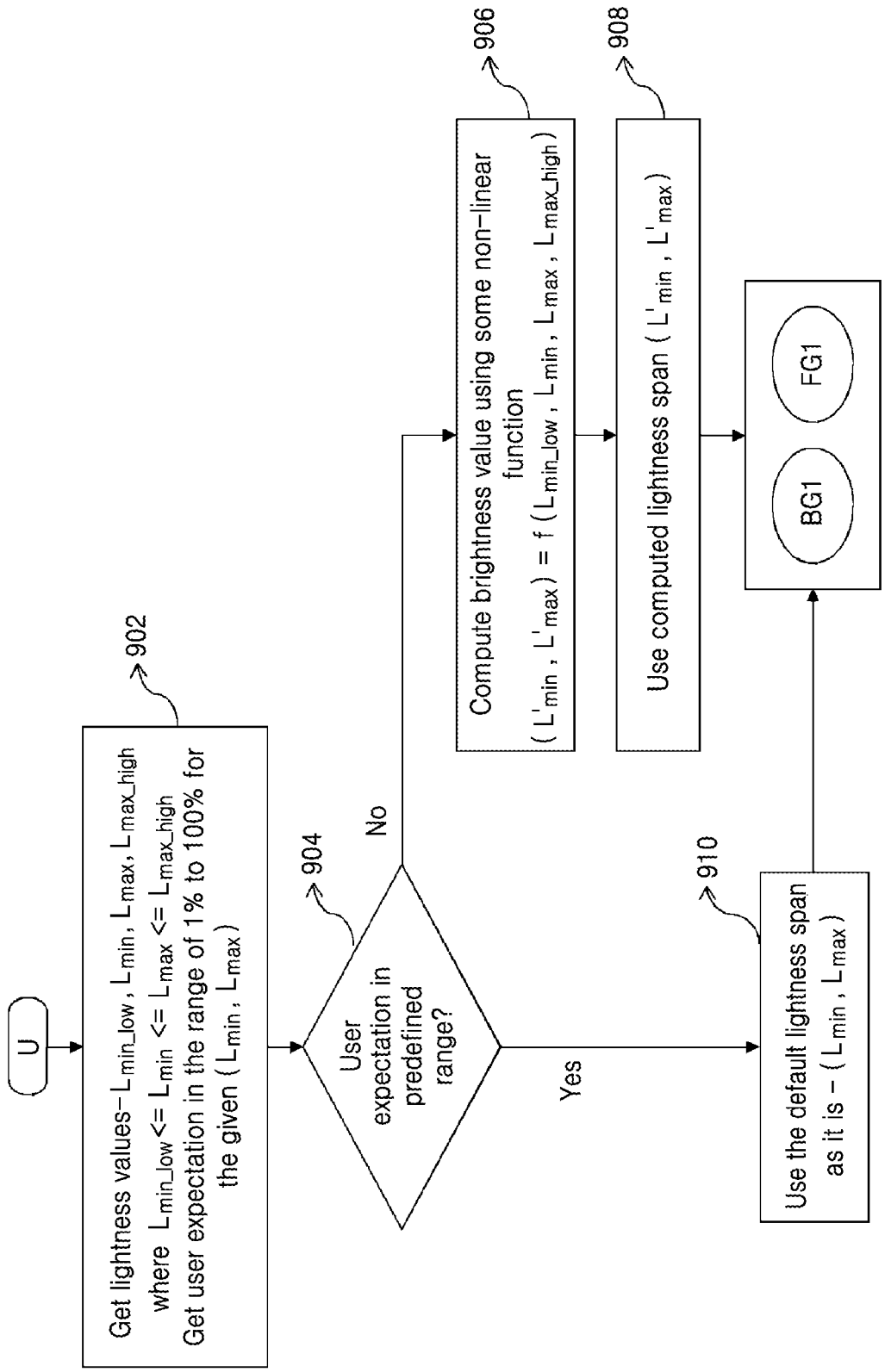
FIG. 9 is a flowchart for adjusting the lightness span based on a user's preference, according to an embodiment.

FIG. 9 is a flowchart for adjusting the lightness span based on a user's preference, according to an embodiment. The method referring to FIG. 9 may be used for both the background and the foreground content. The user's reference relates to a contrast between background and foreground required by the user. In operation 902, the candidate lightness values/candidate brightness values such as $L_{min\_low}$, $L_{min}$, $L_{max}$, $L_{max\_high}$ of the candidate lightness span/candidate brightness span is obtained from the predefine lightness span database/predefined brightness database, where $L_{min\_low}$ is the minimum representation of the minimum value $L_{low}$, and $L_{max\_high}$ is the maximum representation of the minimum value $L_{max}$. The values have relations of $L_{min\_low}<=L_{min}<=L_{max}<=L_{max\_high}$.

In an embodiment, after computing the candidate lightness/brightness values, the user's requirement is obtained, which is, for example, in a range of 1% to 100% for the given values for the lightness span namely $L_{min}$ and $L_{max}$. In operation 904, the electronic device 100 identifies whether the user requirement is in predefined range or not. If the user expectation is in predefined range, the flow proceeds to 910, otherwise to 906. In operation 910, the candidate lightness/brightness span is used as it is. In operation 906, the optimal lightness/brightness span is computed using a non-linear function based on $(L'_{min}, L'_{max})=f(L_{min\_low}, L_{min}, L_{max}, L_{max\_high})$. In operation 908, the optimal lightness span/brightness span is used. After the operations of 908 and 910 the flow proceeds to FG1 if the content is foreground and to BG1 if the content is background.

Figure 10:
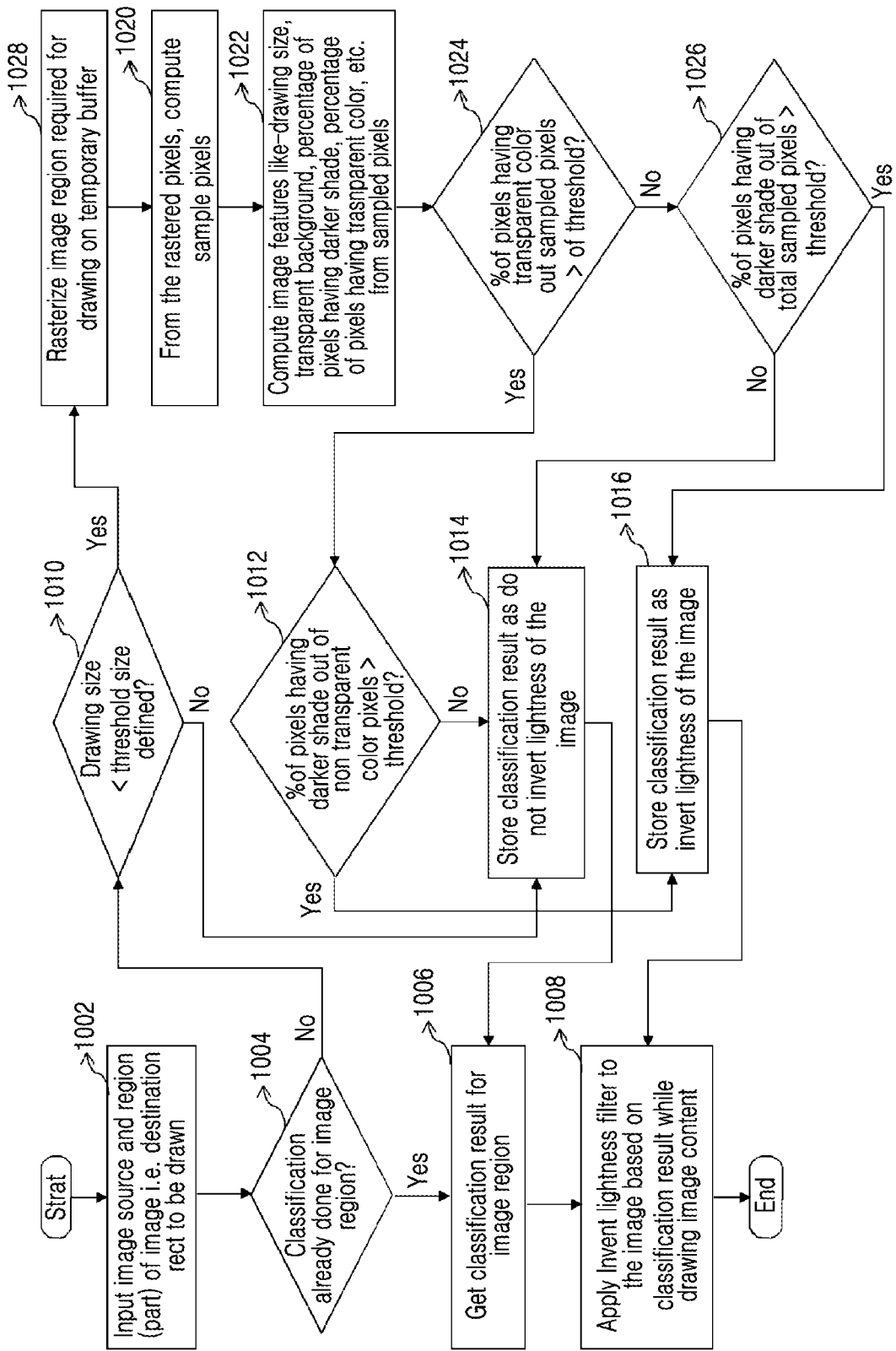
FIG. 10 is a flowchart for applying a lightness inversion on images, according to an embodiment.

FIG. 10 is a flowchart for applying a lightness inversion on images, according to an embodiment. In operation 1002, the region or portion of the image to be drawn is confirmed. In operation 1004, the electronic device 100 identifies whether a classification is already performed for the image region. The flow proceeds to operation 1006 if the classification is already performed and to operation 1010 if the classification is not performed. In operation 1006, the classified results are obtained and an image invert lightness filter is applied to the image based on the classified results in operation 1008. In operation 1010, the electronic device 100 identifies whether a drawing size of the image is less than a defined threshold size. The flow proceeds to operation 1018 if the image drawing size is less than the defined threshold size and to operation 1014 if the image drawing size is not less than the defined threshold size. In operation 1014, the classification result is stored as not to invert the lightness of the image and proceeds to operation 1006. In operation 1018, the image region required for drawing is rasterized on a temporary buffer and sample pixels are computed in operation 1020. In operation 1022, the image features are computed, where the image features may be one of or a combination of a drawing size, transparent backgrounds, percentage of pixels having darker shade, percentage of pixels having transparent color and the like from the sampled pixels.

In operation 1024, the electronic device 100 identifies whether the percentage of pixels having transparent color out of sampled pixels is greater than the predefined threshold. The flow proceeds to operation 1026 if the percentage of pixels having transparent color out of sampled pixels is not greater than the predefined threshold. The flow proceeds to operation 1012 if the percentage of pixels having transparent color out of sampled pixels is greater than the predefined threshold. In operation 1012, the electronic device 100 identifies whether the percentage of pixels having darker shade out of the non-transparent color pixels is greater than the predefined threshold. The flow proceeds to operation 1016 if the percentage of pixels having darker shade out of non-transparent color pixels is greater than the predefined threshold. The flow proceeds to operation 1014 if the percentage of pixels having darker shade out of non-transparent color pixels is greater than the predefined threshold. In operation 1016, the classification result is stored as to invert the lightness of the image and the flow proceeds to operation 1008.

In operation 1026, the electronic device 100 identifies whether the percentage of pixels having darker shade out of the total sampled pixels is greater than a predetermined threshold. The flow proceeds to operation 1014 if the percentage of pixels having darker shade out of the total sampled pixels is not greater than the predetermined threshold and to operation 1016 if the percentage of pixels having darker shade out of the total sampled pixels is greater than the predetermined threshold.

Figure 11:
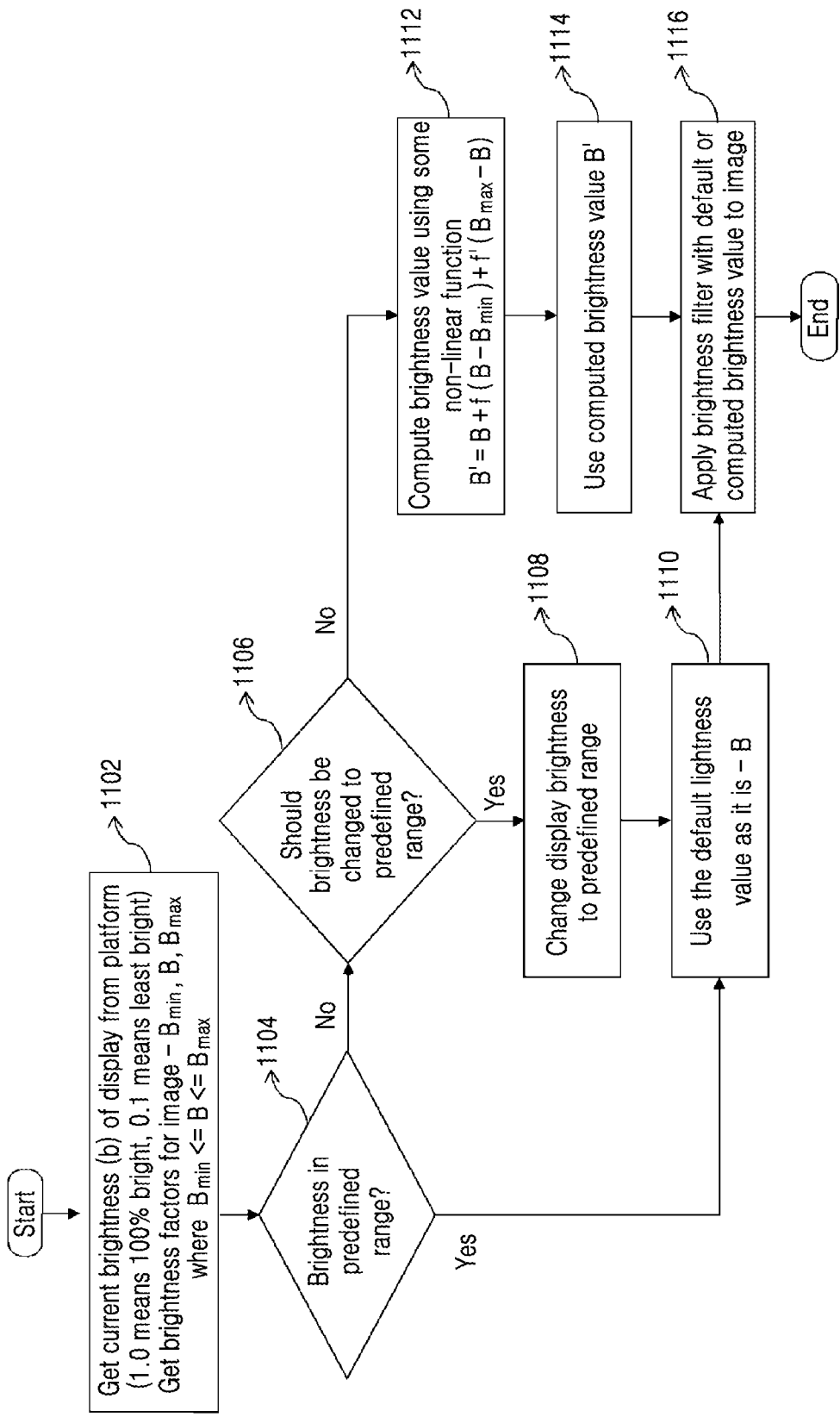
FIG. 11 is a flowchart for applying a brightness filter on the image, according to an embodiment.

FIG. 11 is a flowchart for applying a brightness filter on the image, according to an embodiment. Referring to FIG. 11, the flow for adjusting the brightness of the image according to the display brightness is introduced. In operation 1102, the electronic device 100 obtains the current brightness of the image content. Its maximum and minimum values of $Bi_{min}$ and $Bi_{max}$ are also obtained. The brightness of the image may in a range from 1 to 0.1. The "1" in the range indicates that the image is 100% bright and "0.1" indicates that the brightness of the image has the smallest value. The flow then proceeds to operation 1104. In operation 1104, the electronic device 100 identifies whether the brightness of the image is in the predefined range or not. The flow proceeds to operation 1106 if the brightness in not in the predefined range, otherwise the flow proceeds to operation 1110. In operation 1106, the electronic device 100 identifies whether the brightness needs to be changed to a predefined range. If the brightness needs to be changed to the predefined range then the flow proceeds to operation 1108, otherwise the flow proceeds to operation 1112. In operation 1108, the brightness of the image is changed to be within the redefined range. In operation 1110, the brightness values are used as the default values. In operation 1112, when the brightness value of the image is not to be changed to be within the predefined range then the new brightness value is computed using a non linear function. Let the new brightness value of the image be Bi'. The non linear function is a function of the default lightness value Bi, its maximum and minimum values $Bi_{min}$ and $Bi_{max}$, and brightness value Bd of the display unit 130. In an embodiment, the linear function is given by $Bi'=Bi+f((Bi-Bi_{min}), Bd)+f'((Bi_{max}-Bi), Bd)$ In operation 1114, the electronic device 100 uses the computed brightness value Bi'. In operation 1116, the electronic device 100 applies a brightness filter with default Bi or computed brightness value Bi' to the image.

In an embodiment, the lightness values can be used for changing the image in a night mode or in a high contrast mode.

Figure 12:
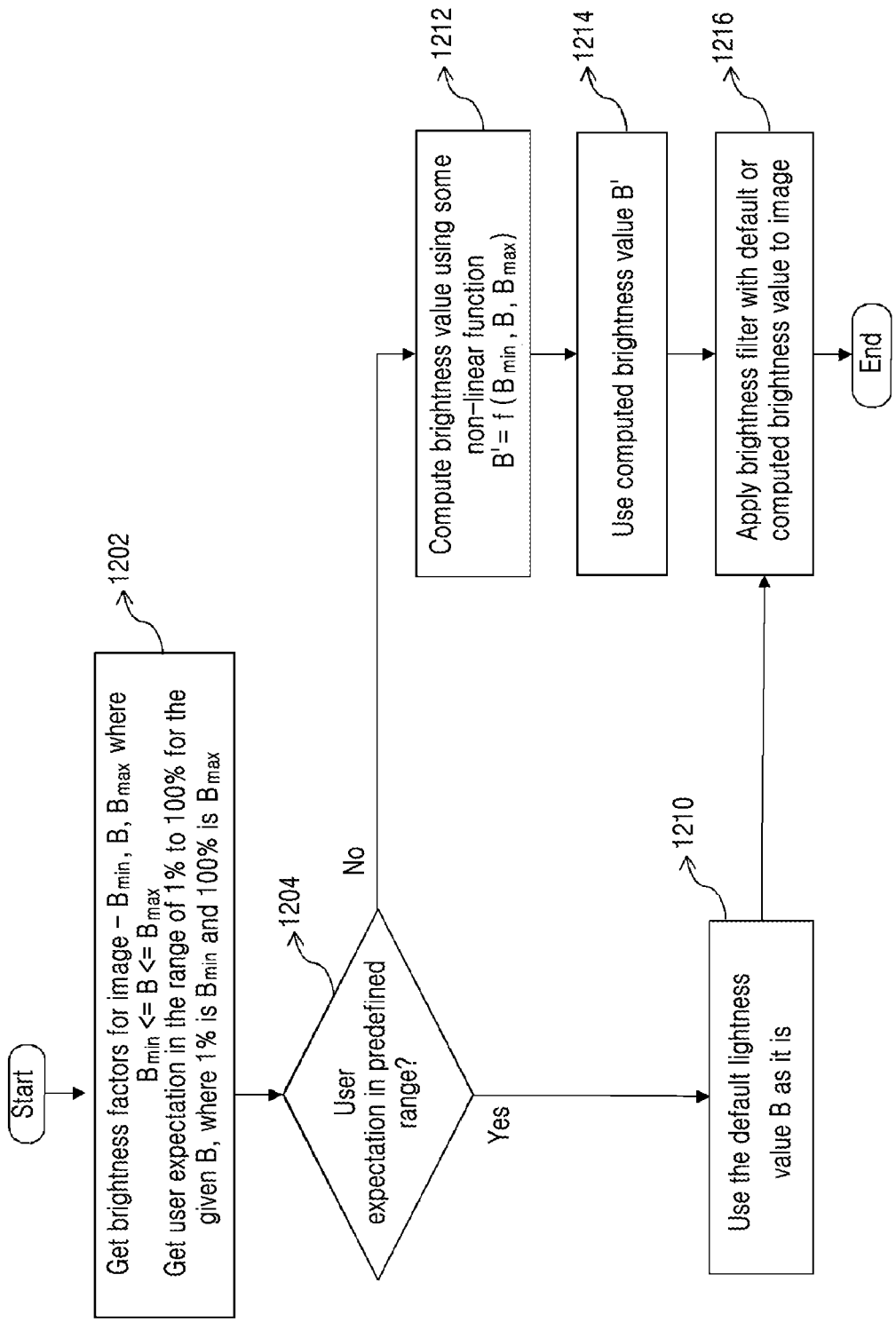
FIG. 12 is a flowchart for applying a brightness filter on the image, according to an embodiment.

FIG. 12 is a flowchart for applying a brightness filter on the image, according to an embodiment. Referring to FIG. 12, the brightness of the image is adjusted according to the user's preference. In operation 1202, the electronic device 100 obtains current brightness of display unit 130 denoted by B. Its maximum and minimum values ($Bd_{min}$, $Bd_{max}$) of the current brightness are also obtained. The brightness of the display unit 130 may be in a range from 1 to 0.1. The "1" in the range indicates that the display unit 130 is 100% bright and "0.1" indicates that the brightness of the display unit 130 has the smallest value. The flow proceeds to operation 1204. In operation 1204, the electronic device 100 identifies whether the user's expectation is in the predefined range. The flow proceeds to operation 1206 if the brightness in not in the predefined range, otherwise the flow proceeds to 1208. In operation 1208, the default brightness value is used as it is. In operation 1206, where the user expectation is not within the predefined range the then the new brightness value is computed using a non linear function. Let the new brightness value be Bd'. The non linear function is a function of the default lightness value Bd and its maximum and minimum values $Bd_{min}$ and $Bd_{max}$. In an embodiment, the linear function is given by $Bd'=Bd+f(Bd-Bd_{min})+f'(Bd_{max}-Bd)$.

In operation 1210, the electronic device 100 uses default brightness value B. In operations 1212, the electronic device 100 computes the brightness value B' with the default value B, and $B_{min}$ and $B_{max}$. In operation 1214, the electronic device 100 uses the computed brightness value B' for the next operation 1216 and in operation 1216, the electronic device 100 applies a brightness filter with default B or computed brightness value B' to the image.

Figure 13:
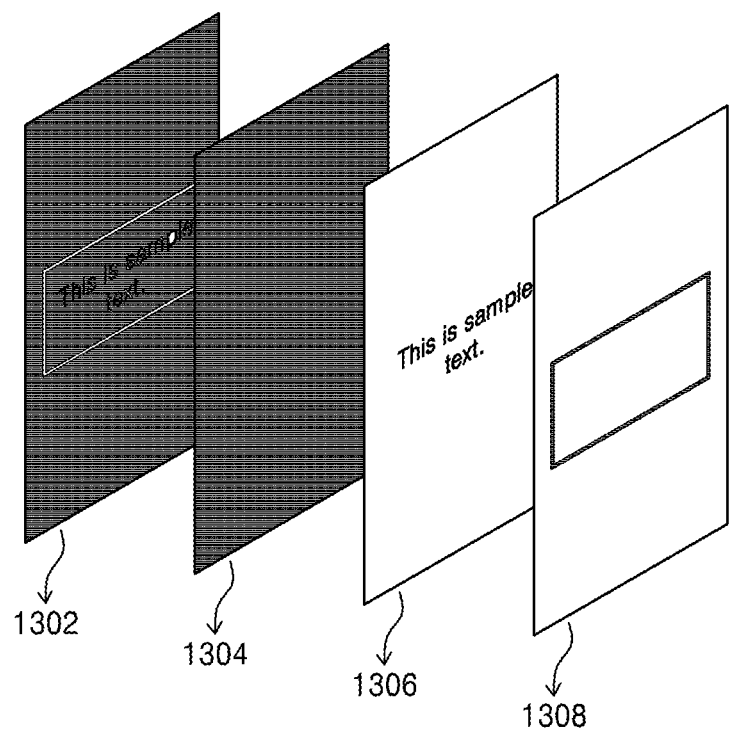
FIG. 13 illustrates an example embodiment of classifying the available content into plurality of regions, according to an embodiment.

FIG. 13 illustrates an example embodiment of classifying the available content into plurality of regions, according to an embodiment. Referring to FIG. 13, the available content is the final frame 1302. The final frame 1302 is divided into plurality of regions including a background region 1304, a foreground text region 1306, and a border region 1308.

Figure 14A:
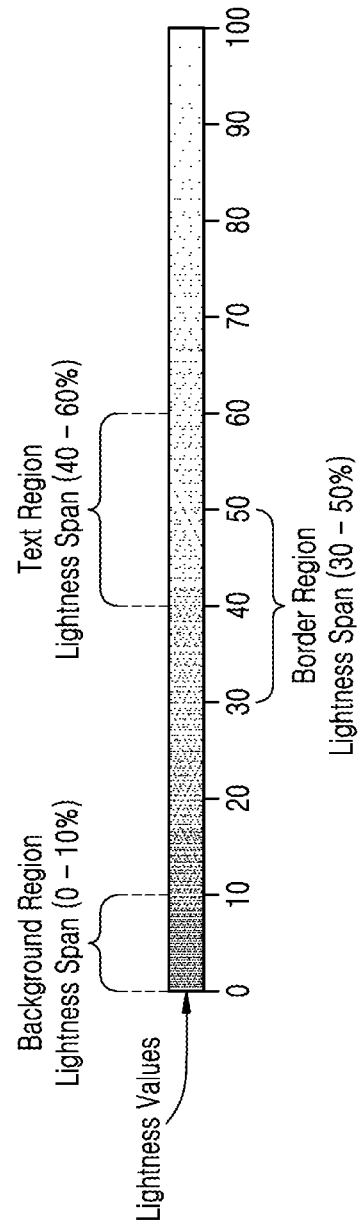
FIG. 14A illustrates an example embodiment of changing lightness span values for different regions, according to an embodiment.

FIG. 14A illustrates an example embodiment of changing lightness span values for different regions, according to an embodiment. Referring to FIG. 14, the span location and/or the values of lightness/brightness span for the background region 1304, the border region 1308 and the foreground text region are different one another. The lightness/brightness span for each of the region is defined using lightness values/brightness values which are a maximum lightness/brightness value and a minimum lightness/brightness value. The given color's lightness is fitted into the range defined by lightness/brightness span for the color's region.

Figure 14B:
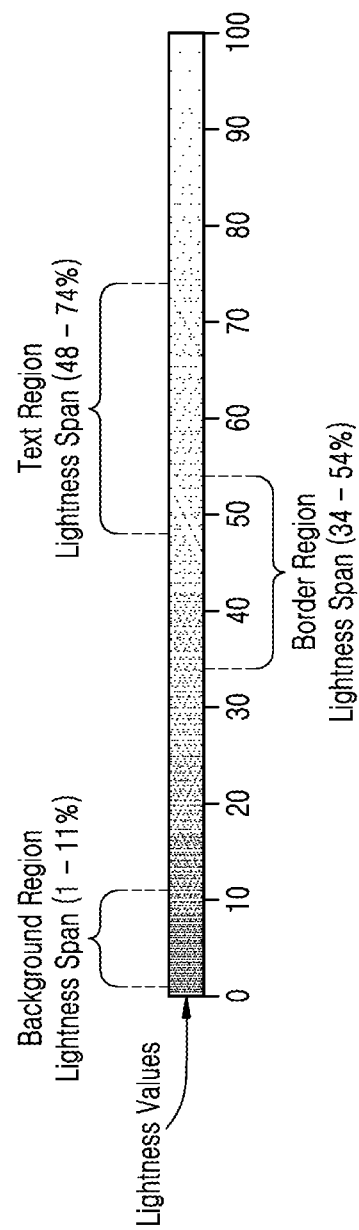
FIG. 14B illustrates an example embodiment of changing lightness span values for different regions, according to an embodiment.

FIG. 14B illustrates an example embodiment of changing lightness span values for different regions, according to an embodiment. Referring to FIG. 14B, the lightness/brightness span for the background region 1304 are changed from 0-10% to 1-11%. Similarly there are changes in the lightness/brightness span for the foreground text region 1306 and the border region 1308. With respect to the foreground text region, the lightness/brightness span is placed in the range of 40-60% when the brightness of the display unit is in normal range as depicted in FIG. 14A and is changed to 48-74% when the brightness of the display unit is reduced as depicted in FIG. 14B. With respect to the border region, the lightness/brightness span is placed in the range of 30-50% as depicted in FIG. 14A when the brightness of the display unit is in normal range and is changed to 34-54% when the brightness of the display unit is reduced as depicted in FIG. 14B.

Figure 15:
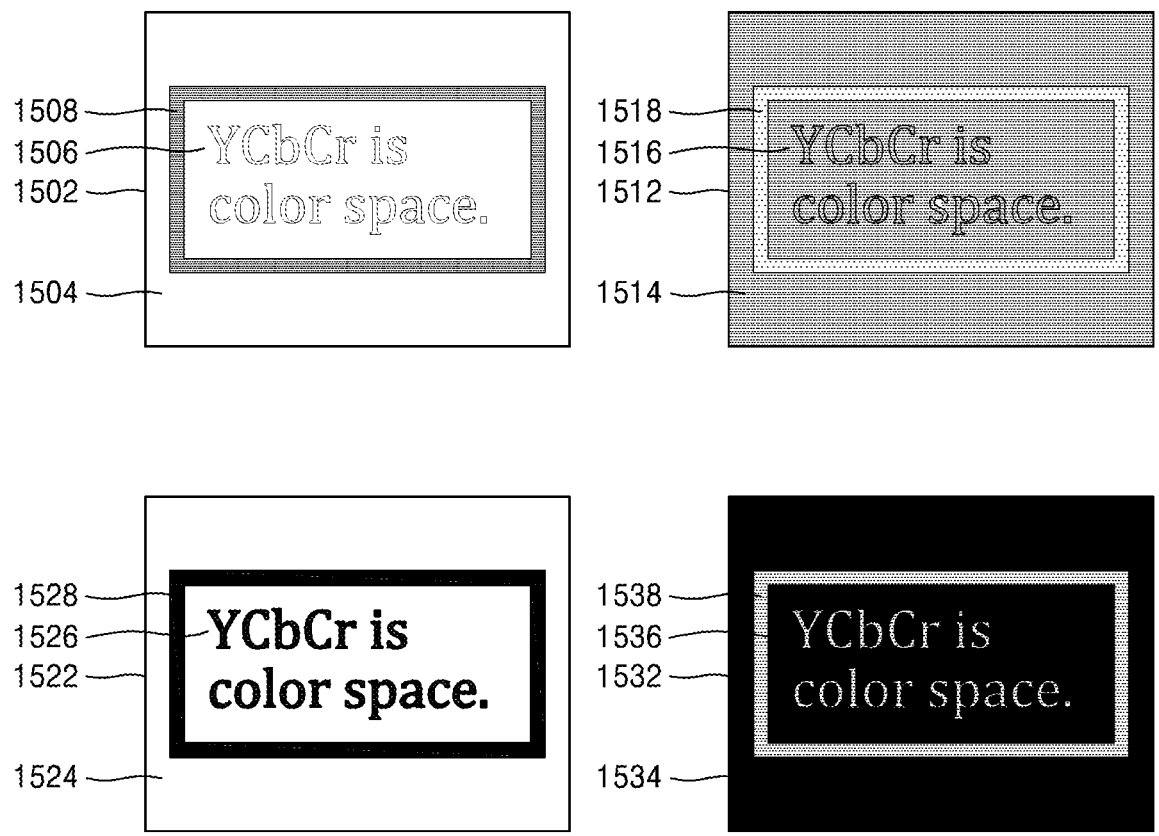
FIG. 15 illustrates exemplary images after preserving original contrast between foreground and background, according to an embodiment.

FIG. 15 illustrates images after preserving original contrast between foreground and background, according to an embodiment. Images 1502, 1512, 1522, and 1532 illustrate the effect of differences in contrast between background and foreground. The image 1502 and image 1522 are original contents having difference in contrast, while the image 1512 and image 1532 illustrate contents after applying a night mode according to an embodiment. The image 1502 is an original content before applying the night mode. In the image 1502, 1504 represents the background, 1506 represents the foreground text of the image 1502 and 1508 represents the border of the image 1502. The image 1512 represents the image content after applying the night mode to the image 1502. In the image 1512, 1514 represents the background, 1516 represents the foreground text of the image 1512 and 1518 represents the border of the image 1512. The image 1522 shows another image content, where 1524 represents the background of the image 1522, 1526 represents the foreground text of the image 1522 and 1528 represents the border of the image 1522. The image 1532 represents the image content after applying the night mode to the image 1522. In the image 1532, 1534 represents the background of the image 1532, 1536 represents the foreground text of the image 1532 and 1538 represents the border of the image 1532.

The contrast between 1504 and 1506, 1508 is less than contrast between 1524 and 1526, 1528. The proposed method helps achieve the same effect after applying the night mode, as seen contrast between 1514 and 1516, 1518 is less than contrast between 1534 and 1536, 1538.

Figure 16:
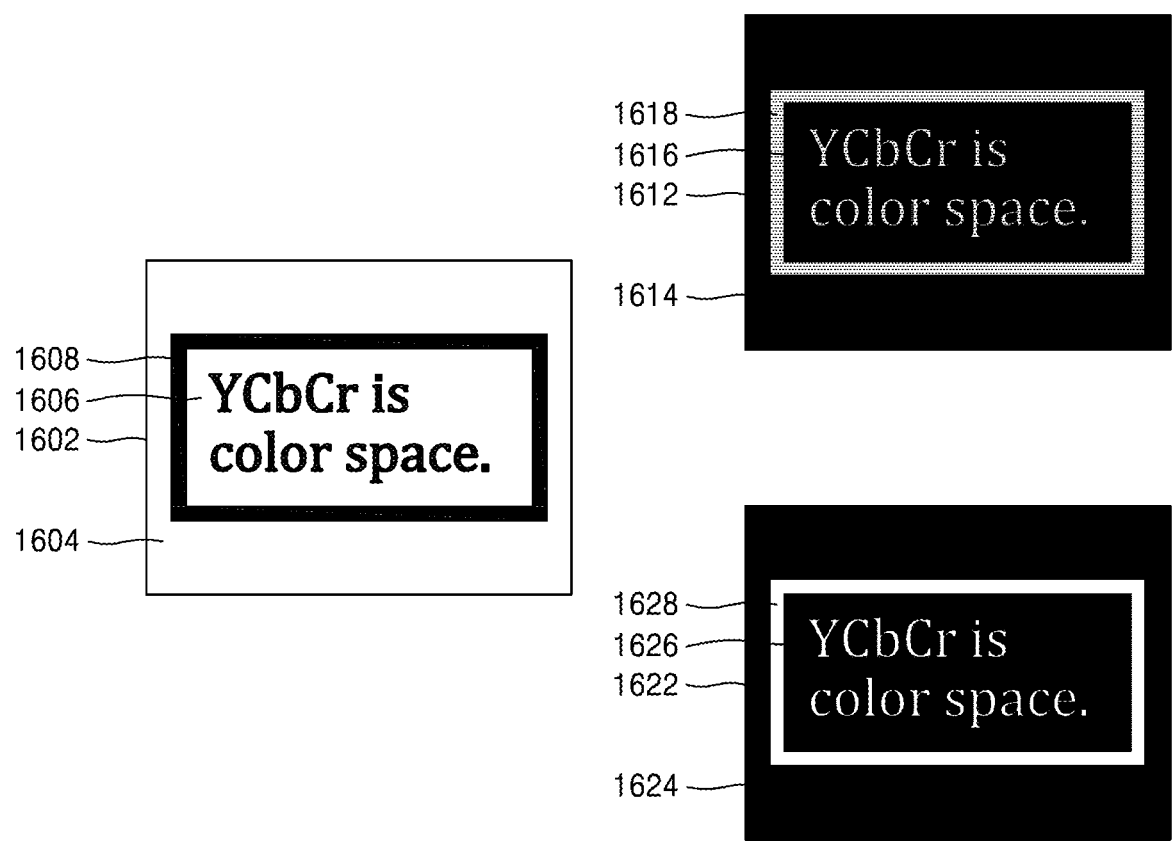
FIG. 16 illustrates exemplary contents showing the effect of night mode and high contrast mode, according to an embodiment.

FIG. 16 illustrates example contents showing the effect of night mode and high contrast mode, according to an embodiment. The image 1602 represents original content, while the image 1612 and 1622 represent contents after applying conventional night mode and high contrast mode, respectively. In the image 1602, 1604 represents the background, 1606 represents the foreground text of the image 1602 and 1608 represents the border of the image 1602. The image 1612 represents image content after applying a night mode to the image 1602. In the image 1612, 1614 represents the background, 1616 represents the foreground text of the image 1612 and 1618 represents the border of the image 1612. The image 1622 represents image content after applying a high contrast mode to the image 1602. In the image 1622, 1624 represents the background, 1626 represents the foreground text of the image 1622 and 1628 represents the border of the image 1622. The proposed method helps define different lightness/brightness spans for different modes. As seen in example, the lightness spans of the foreground in 1622 have much lighter values than the foreground of 1612 which is required for the high contrast mode.

The foregoing descriptions of the embodiments of the disclosure are illustrative, and modifications in configuration and implementation are within the scope of the current description. For instance, while the embodiments of the disclosure are generally described with relation to FIGS. 1-9, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. Also, the disclosure is not limited by the illustrated order of the method steps, the order may be modified by a skilled person without creative efforts. Some or all of the method steps may be performed sequentially or concurrently. The scope of the embodiment of the disclosure is accordingly intended to be limited only by the following claims.

What is claimed is:

1. A method of rendering a content in an electronic device, the method comprising:
    classifying, by the electronic device, a plurality of regions in the content, wherein at least one of a lightness factor or a brightness factor is defined for each of the regions;
    obtaining, by the electronic device, at least one of a candidate lightness span or a candidate brightness span for each of the classified regions from a database;
    identifying, by the electronic device, a current brightness level of a display of the electronic device;
    identifying, by the electronic device, at least one of a lightness span or a brightness span by adjusting at least one of the candidate lightness span or the candidate brightness span based on the current brightness level of the display;
    modifying, by the electronic device, the content corresponding to each of the classified regions using at least one of the lightness span or the brightness span; and
    rendering, by the electronic device, the modified content for each of the classified regions,
    wherein the rendering of the modified content comprises:
    selecting a BT.709 YCbCr color space technique, or a BT.2100 YCbCr color space technique, based on a progressive scan technique determined to be used for rendering the modified content, wherein the BT.709 YCbCr color space technique is selected based on a low-dynamic-range being used for a High Definition (HD) or a Ultra High Definition (UHD) display resolution, or the BT.2100 YCbCr color space technique is selected based on a high-dynamic-range being used for a HD or a UHD display resolution.

2. The method of claim 1, wherein the modifying of the content corresponding to the each of the classified regions comprises:
    identifying, by the electronic device, a color space associated with each of the classified regions;
    converting, by the electronic device, the color space to a new color space with the lightness factor;
    spanning, by the electronic device, the lightness factor on at least one of the lightness span or the brightness span of each of the classified regions; and
    modifying, by the electronic device, the content in each of the classified regions based on the color space and at least one of the lightness span or the brightness span.

3. The method of claim 1, wherein the plurality of regions comprises at least one of a background region, or a foreground region.

4. The method of claim 1, wherein the obtaining of the at least one of the candidate lightness span or the candidate brightness span comprises:
    identifying, by the electronic device, whether a color of the content corresponds to one of a background color or a foreground color for each of the classified regions; and
    performing at least one of:
        based on the color of the content corresponding to the background color, inputting the background color and a region where the background color is used in the color space associated with each of the classified regions, and identifying at least one of the candidate lightness span or the candidate brightness span based on the current brightness level of the display; or
        based on the color of the content corresponding to the foreground color, inputting the foreground color and a region where the foreground color is used in the color space associated with each of the classified regions, and identifying at least one of the candidate lightness span or the candidate brightness span based on the current brightness level of the display.

5. The method of claim 1, wherein the obtaining of at least one of the candidate lightness span or the candidate brightness span comprises:
    identifying, by the electronic device, whether the current display brightness level is in a predefined display brightness criteria, or whether the current display brightness level needs to be changed to the predefined display brightness criteria based on the current display brightness level not being within the predefined display brightness criteria;
    performing, by the electronic device, one of:
        based on the current display brightness level being within the predefined display brightness criteria, identifying at least one of the lightness span or the brightness span based on at least one of the candidate lightness span or the candidate brightness span;

based on the current display brightness level needing to be changed to the predefined display brightness criteria, changing the current display brightness level of the display to the predefined display brightness criteria, and identifying at least one of the lightness span or the brightness span based at least one of the candidate lightness span or the candidate brightness span; or based on the current display brightness level not needing to be changed to the predefined display brightness criteria, computing at least one of the lightness span or the brightness span based on the at least one of the candidate lightness span or the candidate brightness span.

6. The method of claim 1, further comprising identifying a user's preference;

identifying whether the user's preference is in a predefined range; and performing one of:

based on the user's preference being within the predefined range, retrieving at least one of the candidate brightness span or the candidate lightness span from the database; or based on the user's preference not being within the predefined range, computing at least one of the lightness span or the brightness span based on the user's preference and modifying the color based on the at least one of the computed brightness span or the computed lightness span.

* * * * *